United States Patent

[11] 3,593,852

[72] Inventor  Lewis Smith Meriwether
              Stamford, Conn.
[21] Appl. No. 848,475
[22] Filed     Aug. 8, 1969
[45] Patented  July 20, 1971
[73] Assignee  American Cyanamid Company
              Stamford, Conn.

[54] REVERSE OSMOTIC WATER PURIFICATION
     3 Claims, 1 Drawing Fig.
[52] U.S. Cl. .................................................. 210/321,
                                                210/490, 210/500
[51] Int. Cl. ............................................. B01d 39/00,
                                                        B01d 31/00
[50] Field of Search .......................................... 210/22, 23,
                                                        321, 490, 500

[56]                  References Cited
                UNITED STATES PATENTS
3,449,245   6/1969   Johnson et al. ...............   210/23
3,457,171   7/1969   Flowers et al. ...............   210/23
                   OTHER REFERENCES
  1963 SALINE WATER CONVERSION REPORT,
Received in Patent Office September 25, 1964, 187 pages, pp.
34— 41 relied on, for sale by Supt. of Documents, U.S. Printing Office.
  1967 SALINE WATER CONVERSION REPORT,
Received in Patent Office November 1, 1968, 421 pages, pp. 51 and 52 relied on Primary Examiner—Frank A. Spear, Jr.
Attorney—Samuel Branch Walker ABSTRACT: Brackish or saline water may be purified by forcing the water under comparatively high pressure through a reverse osmotic membrane consisting of the reconstituted membranes derived from living cells such as red blood cells, which reconstituted membranes themselves are in the order of 50 to 150 Angstroms thick with at least one and perhaps several layers of such reconstituted membranes supported on a support layer which may be of a water permeable cellulose which in turn is mechanically reinforced by a grid, porous plate or ceramic-type plate which has high mechanical strength. The membrane is formed by ultrasonic rupturing of the cell membranes followed by the reaggregation of the resulting lipoprotein subunits into a continuous membrane having a thickness and composition similar to that of the intact cell membrane but of much greater size.

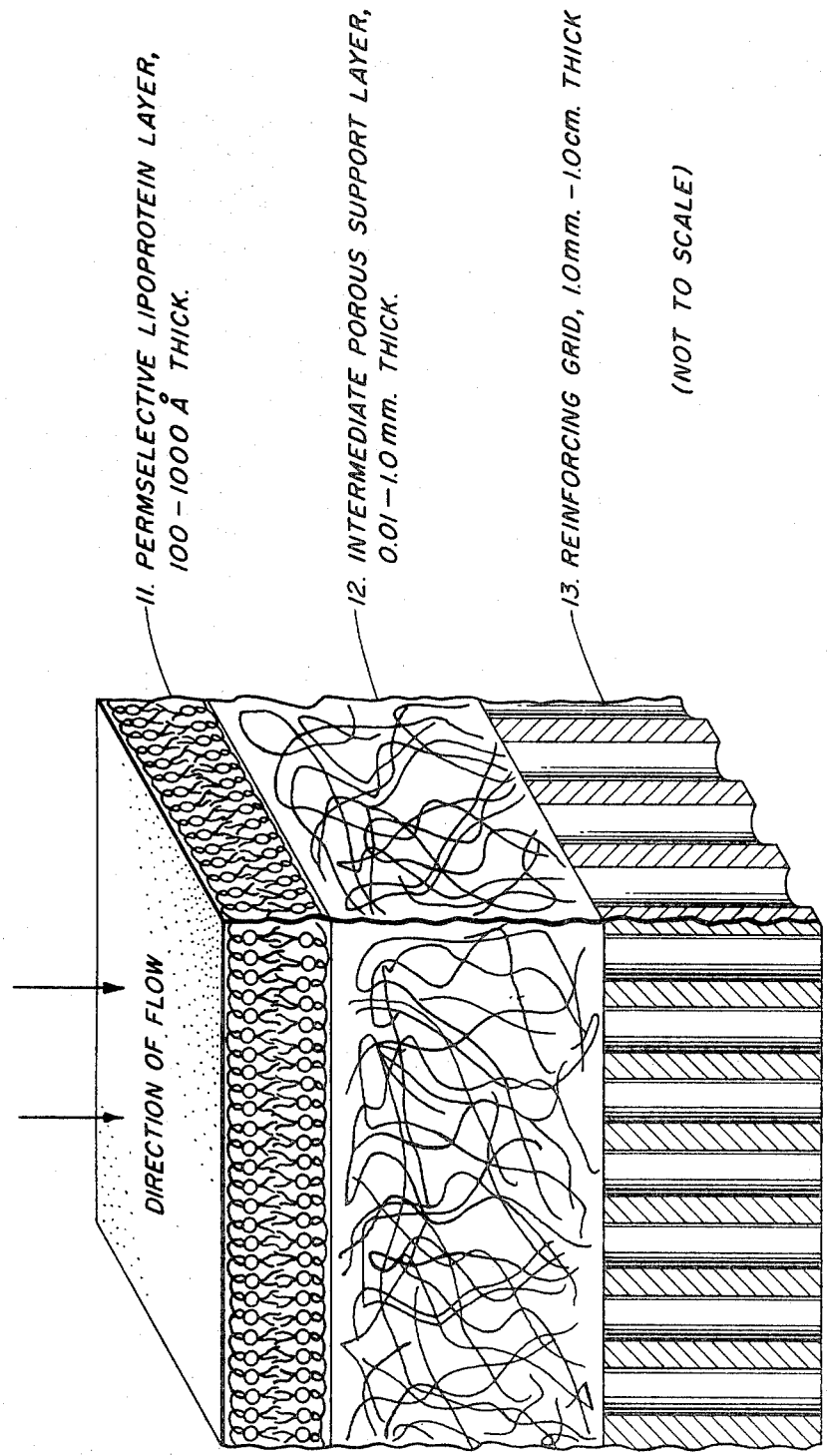

3,593,852

REVERSE OSMOTIC WATER PURIFICATION

SUMMARY OF THE INVENTION

This invention relates to the purification of brackish or saline waters by forcing the water under pressure through a reconstituted permselective membrane derived from natural sources and formed by the reaggregation of disintegrated cell membranes from living cells. Advantage is thereby taken of the remarkable permeant selectivity characteristics of these membranes which membranes as they occur in nature are of such small extent as to be initially unusable for such a purpose and which are mechanically delicate but are supported on a protective layer of sufficient strength that the membrane can stand the pressures required for reverse osmosis.

The use of the reverse osmosis phenomenon for the treatment and purification of water has been known for some time. The text, ACS Monograph No. 156, Sidney B. Tuwiner, Diffusion and Membrane Technology; Reinhold Publishing Co., New York, 1962, at page 341 has as a subheading, Reverse Osmosis, and indicates the osmotic pressure of sea water as 25 atmospheres (370 p.s.i.). Industrial dialyzers and membranes are discussed at length in the monograph.

The United States Department of the Interior, Office of Saline Water, in Research and Development Progress Report No. 268, of Sept. 1967, H. E. Podall et al., "Recommended Procedures for the Testing and Evaluation of Candidate Reverse Osmosis Membranes for Desalination," Government Printing Office, Washington D. C. (20 cents) describes performance parameters, and a testing technique to evaluate membranes. Pumps with maximum pressures of 2,000 to 3,000 p.s.i. are recommended.

Pressures used for reverse osmosis of sea water vary from a minimum of about 500 p.s.i. to at least 2,000 p.s.i. The greater the pressure, the greater the flow rate, but also the greater the mechanical strength required for all components, and the greater the cost of pumping against the pressure head.

The treatise edited by Charles Bishop and Douglas M. Surgenor, The Red Blood Cell, Academic Press, New York, 1964, has a chapter at page 71 by Hermann Passow on "Ion and Water Permeability of the Red Blood Cell." The permeability characteristics of the external membrane of the red blood cell have been studied at length by many persons. The list of references at the end of said chapter shows 282 entries.

The intact red blood cell is so small that the membrane surrounding it cannot be used as such as a useful dialysis membrane, having an area of only about 150 square microns.

It has now been found that the "ghosts" or cell membranes of red blood cells can be mechanically subdivided by the use of ultrasonic energy so that the cell membranes or ghosts are fragmented mechanically without unduly altering their physical or chemical characteristics. The resulting fragments are believed to be lipoprotein subunits of the parent cell membranes. The fragmented cell membranes are then reconstituted into a fragile membrane with a thickness of the order of from about 50 to 300 Angstroms. These reconstituted membranes possess the same uniquely useful permeability characteristics as the membrane of the intact blood cell. These reconstituted membranes are supported on an intermediate support layer which has a great permeability to water, but sufficient mechanical strength to support the reconstituted membrane formed from the cell walls; and the reconstituted membrane on the intermediate support layer is mechanically supported by a strong grid which may be silica, porcelain, sintered glass, porous sintered metal or a fine woven metallic screen of about 20 to about 200 mesh, or a perforated metallic plate. The mechanically strong grid gives firm mechanical support, the intermediate support layer gives detailed mechanical support, without markedly decreasing water permeability. The reconstituted cell wall, while mechanically fragile, when thus supported by the intermediate layer has the unique permselectivity required for effective reverse osmotic purification of sea water, or brackish water, or other saline naturally occurring waters.

The remarkable selective permeability to ions of the plasma membrane of living cells, which membranes have a thickness of the order of about 100 Angstroms, is utilized by reconstituting such membranes in useful sizes, and supporting the reconstituted biological membrane on a very permeable but mechanically stronger support layer which may be porous cellulose acetate or similar material, which in turn is supported by a mechanical grid.

The term permselectivity is used in this field to designate the selective permeability to various components, particularly as applied to a membrane which has a selective and greater permeability to water over dissolved solutes.

The plasma membranes of living cells have remarkable permselectivity properties. Although freely permeable to water and small anions, they have a very low permeability to small cations such as $Na^+$ and $K^+$. Typically, cell plasma membranes consist for the most part of protein and phospholipids and as such may be classified as lipoprotein in nature. A representative type of cell plasma membrane is that of the red blood cell, which consists of about 45 percent protein, 45 percent phospholipid plus cholesterol and 10 percent polysaccharide. The protein and lipid are tightly complexed together since mechanical disruption of the membrane produces "lipoprotein subunits" which are not readily degraded further except by chemical treatment as, e.g., with detergents.

The mechanically disrupted subunits produced by the ultrasonic disruption of the cell membranes reaggregate at an interface in the presence of certain salts into large continuous membranes having a thickness and composition similar to that of the intact cell membrane, but which have such size and shape as to be useful for many purposes. For use in the fields of biology and medicine because of the biological natures of the materials, it may be important that the membrane have originated from a particular species.

For the present purposes of forming osmotic membranes, the red blood cells of mammals in general are satisfactory. For instance, in medical applications or tests human blood cells would be preferable in order that the characteristics be that of the human cell membrane, but for osmotic purposes either the human blood cell or more conveniently the blood cells of cattle, sheep, pigs, or other animals from slaughterhouses may be used and are an economical source of such red blood cells.

The differential permeability of red blood cells to various substances is easily shown by determining the halflife for penetration of the cell wall, conveniently in the intact cells. The time for such penetration for typical materials is shown in the following Table 1:

TABLE I

Permeability of Red Cell to Various Substances

| Substance | $^1$1/2 Penetration (sec.) |
|---|---|
| $H_2O$ | 0.003 |
| methanol | 0.13 |
| $Cl^1$ | 0.2 |
| $HCO_3^1$ | 0.2 |
| ethanol | 0.3 |
| butanol | 0.7 |
| acetamide | 0.9 |
| ethylene glycol | 1.7 |
| $SO_4^-$ | 18 |
| glycerol | 60 |
| oxalate | 60 |
| $NH_4^+$ | 180 |
| maleate | 420 |
| malonamide | 1,025 |
| fumarate | 4,400 |
| erythritol | 10,800 |
| succinate | 13,200 |
| $Na^+$ | 72,000 (20 hours) |

TABLE I—Continued

| | |
|---|---|
| tartrate | 130,000 |
| K$^+$ | 156,000 |
| Ca$^{++}$ | 100,000,000 |
| sucrose | $\alpha$ |
| choline | $\alpha$ |

In the past, a membrane which has been used for reverse osmotic water desalinization has been Loeb-Sourirajan membrane which is formed on a porous cellulose acetate matrix as a thin skin layer of dense cellulose acetate having a low porosity. The salt rejecting characteristics of the dense cellulose acetate provide the rejection mechanism and the more porous cellulose acetate matrix supports such skin layer.

In the past, much work and calculations were premised on a pore size concept in which the membrane is considered as having pores or holes therethrough of such size that a water molecule may readily pass through the hole but dissolved materials, particularly electrolytes have such a physical size that passage is barred. Such a hypothesis could be called the fly screen principle from an analogy to a fly screen in which the holes through the screen are too small for the flies to pass but yet big enough for air to pass. As may be readily seen, the size and number of holes controls the rate of water passage and the viscosity of water together with viscous flow rates appears controlling from a theoretical standpoint, and in practice comparatively low rates are found to exist. The thicker the skin layer, the greater the resistance, and the porous support matrix may compress under conditions of use thus further reducing the flow of water.

From the above table it can be seen that the permeability of the red cell membrane is based on factors in addition to the actual physical size of the molecules or ions. This may be in part due to the ready hydration of certain cell membrane components and it may in part be due to chelating characteristics in which certain ions form a chelate which prevents the passage of the ions or forms a chelate or other bond which enhances and aids the rapid penetration of some ions through the cell membrane. The exact mechanisms involved are somewhat obscure.

The new membrane of permselective lipoprotein units reconstituted into a membrane avoids the problems with the thin surface skin of dense cellulose and has not only the mechanical but also the chemical characteristics which avoid the disadvantages of a cellulose film and at the same time offers considerable flexiblity in the design of composite membranes for specific separation processes. These new supported lipoprotein membranes possess a very thin (50 to 300 Angstroms) permselective skin of high water permeability plus a noncompressible highly porous support. In contrast to the Loeb-Sourirajan membranes, which as a result of their manner of fabrication, must consist entirely of the same material, namely cellulose acetate, these supported lipoprotein membranes may consist of salt rejecting barriers originating from a number of different cell membrane sources and having a wide range of lipid, protein and polysaccharide composition. The supporting layer may consist of any one of a large number of polymeric, organic or inorganic materials, including gel cellulose, cellulose acetate, paper, cross-linked gelatin, pectins, alginates, dextrans, polyvinylalcohol, polyvinylpyrrolidone, polyvinylacetate, polyesters, polyethers, polyamides, polysulfones, polyurethanes, poly(vinylene) carbonate, polyacrylonitrile, polyvinlychloride, polystrene, polyethylene, polypropylene, polytetrafluoroethylene, porous silica, other ceramic materials, sintered metals, etc., with the only requirement that the support membrane be of low compressibility and be in a porous state, but with very small pore size—of the order of microns.

These novel supported lipoprotein membranes are prepared in several ways: (1) by lifting the preformed lipoprotein membrane off an air-water interface onto the support, (2) by sucking the subphase below the preformed lipoprotein membrane through the support film by gravity or suction filtration, thus depositing the thin membrane on the support, (3) by preparing the lipoprotein membrane in situ on the surface of the water-swollen support, (4) by sucking s suspension of "-soluble" lipoprotein membrane subunits through the support which was previously loaded with certain salts, or (5) by sucking a suspension of preformed lipoprotein membrane fragments through the porous support.

The support layer may be fabricated by any number of film-forming techniques well known to those experienced in the art, such as casting on liquid or solid surfaces, spraying, extrusion, drawing, sintering, settling or fabric bonding.

The intermediate support layer must have a pore size small enough so that the membrane is adequately mechanically supported over pores. As the membrane itself may consist of from one to several cell membrane thicknesses, the layer is from about 100 Angstroms to 1,000 Angstroms thick. Depending upon the number of membrane thicknesses and the pressures used, the membrane may safely bridge pore sizes of from about 0.01 micron or less to about 3 microns.

The support layer may be actually sufficiently mechanically strong to serve as both the support layer and the mechancial support, but normally separate layers are preferred because, if the support layer is sufficiently porous and low in flow resistance to permit maximum utilization of the permselective characteristics of the naturally occuring lipoprotein membranes as here disclosed, the flow rates through such material will be less than preferred. By using a thin support layer which is in turn mechanically supported by a strong mechanical support, the mechanical support may be a comparatively course sintered metal, sintered glass, ceramic material or a fine screen or a metal plate having fine perforations therein which gives sufficient mechanical support and yet practically no resistance to the flow of water.

As starting material for preparation of the reconstituted lipoprotein membranes any natural source of lipoprotein may be used. This is obtained from red blood cells, brain tissue, muscle tissue, yeast, bacteria, chloroplasts from green plants or algae, etc. The membrane lipoprotein must be isolated from the other cytoplasmic and tissue components. In the case of red cell membrane lipoprotein, the washed red cells are caused to swell and burst (a process called hemolysis) by exposing them to a salt solution or water, whose osmotic pressure is sufficiently lower than that within the red cells that the cells swell beyond the elastic limit of their membranes causing the membranes to rupture and release the cytoplasmic cell contents. The resulting ghost membranes are washed free of hemoglobin and other cytoplasmic contaminants. The ghost are then disrupted by sonication in suspension under ice cooling with an ultrasonic generator. Depending upon the degree of disruption desired, taps 6 to 8 of the Branson model S75 Sonifier, or equivalent, may be used over total period of sonication of 0.1 to 10 minutes or longer. The system should not be allowed to warm up above about 15° C. The sonicated ghost preparation is used as prepared or it can be further fractionated into soluble and insoluble portions.

A reconstituted membrane having associated vesicles and particles is obtained from the total sonicated preparation whereas a smooth uniform membrane free from associated vesicles and particles results from the reconstitution of the soluble portion only of the sonicated preparation. This is obtained as the supernatant resulting from the ultracentrifugation of the total sonicated preparation at 100,000 × $g$ for 2 hours at 0°—5° in a Spinco Model L ultracentrifuge, or equivalent. Either the soluble portion or the total preparation may be used. The sonicated lipoprotein subunits are reconstituted interfacially into membranes by treatment with a salt solution in the presence of an air-water interface. Once formed, the reconstituted membranes are washed and then coated onto the porous supporting member by such methods as filtration, dipping, or in situ formation. THe resulting asymmetric composite membrane is then placed on a rigid porous matrix of metal, glass or other rigid and inert material, and is then ready for use in a reverse osmosis cell for water desalination. Drying of the assembly is to be avoided.

The salts which are useful in the formation of these lipoprotein membranes consist of any one or a mixture of water soluble salts of metals of groups IA, IB, IIA, IIB and IIIA of the Periodic Table in concentrations ranging from $10^{15}$ to 1 M depending upon the positive charge and the complexing affinity of the salt-forming metal. Examples of suitable salts include $KCl$, $NaCl$, $CaCl_2$, $MgCl_2$, $SrCl_2$, $LaCl_3$, $RbBr$, $CsI$, $CaSO_4$, $Mg(ClO_4)_2$, $KNO_3$, $AgNO_3$, $CuSO_4$, or $Li_3PO_4$, of which the preferred salts are the alkaline earth and alkali metal halides and sulfates.

DRAWINGS

The attached drawing is a representation of the membrane of this invention. The drawing is not to scale because no single drawing could show both the permselective membrane from the living cell wall and the mechanically strong grid with both to scale.

The permselective membrane 11 is of the order of 50 to 1,000 Angstroms, as indicated, and as reconstituted from living cell walls is diagrammatically represented. Representations of such cell membranes are idealized at best because the thickness is such that it could only be examined with an electron microscope, and any such electron microscope would either be working with a replicate or a dehydrated cell membrane which would undoubtedly change in characteristics during preparation for study by the electron microscope.

The intermediate support layer 12 is again illustrated, but to a different scale as the thickness of this layer may run from less than 1/100 of a millimeter to around a millimeter or more. This layer is approximately 1,000 times as thick as the permselective membrane itself.

The third layer, or support layer 13, is also shown but again, here, while shown as a perforated plate, the size and thickness can vary with the size of the cell being used. It is this layer which furnishes the primary gross mechanical support and for large dialytic areas may have any of the configurations currently used in dialytic cells or filter cells in which the reinforcement is adequate for the type of pressure involved. This may be a mesh screen of about 200 or 300 mesh supported by a perforated steel plate or a sintered plate or a thin, perforated plate, again supported by a solid plate having run off grooves or as may be chosen for the particular dialytic cell in question. For large installations, balanced type plates are used in which by analogy to conventional filter plate techniques, the gross mechanical pressure is counterbalanced by having a membrane on each side of a saline water feed plate and a reinforcing plate having grooves for the expression of purified water to a purified water-collecting trunk with balanced pressures from adjacent cells permitting the plate to be primarily subject to balanced pressures with only the end plates of a stack having sufficient rigid massive reinforcement to withstand the osmotic pressures over the large cell areas which are employed for major saline water purification operations. Such types of construction are common in filter processes.

Obviously, the total area of the working membrane is far greater for major installations where high flow rates are desired. Saline water planes with a capacity of over a million gallons per day are under active consideration. Membranes with any given capacity may be produced in accordance with the present invention, the larger the installation, the lower the relative operating cost per thousand gallons per day.

The present invention is illustrated by the following examples in which temperatures are in degrees C. and where not indicated an ambient temperature of around 20° to 25°C. is understood with parts being by weight unless clearly set forth as by volume.

EXAMPLE 1

Isolation of Membranes   Human blood (440 ml.) from a patient with polycythemia vera was collected into 110 ml. of ACD solution (each 100 ml. of ACD contained 1.32 gm. sodium citrate, 0.44 gm. citric acid, and 1.47 gm. dextrose). Red cells were freed of plasma by being washed twice in 1:10 dilutions with solution A (0.14 M NaCl, 0.001 M ethylenediaminetetraacetate (EDTA), 0.005 M tris(hydroxymethyl)aminomethane (tris) adjusted to pH 7.4 with HCl) and by being harvested after each wash by centrifugation at 4,000 × g for 5 min. The ghosts were prepared by a modification of the hemolysis procedure of J. T. Dodge, C. Mitchell and D. J. Hanahan, Arch. Biochem. Biophys, 100, 119 (1963), in which the phosphate buffer was replaced by tris and EDTA. Cells were hemolyzed by a 1:20 dilution in solution B (0.007 M NaCl, 0.001 M EDTA, 0.005 M tris, pH 7.4). After hemolysis and each wash, the ghosts were harvested by centrifugation at 14,000 ×g for 10 min. The entire isolation procedure was carried out at 4°C.

Freshly packed ghosts were diluted with an equal volume of solution C and 40 ml. aliquots were disrupted in 50 ml. beakers in an ice bath using a model S75 Bronson Sonifier with a precooled ⅜-inch probe. The membranes were disrupted by two successive 30 sec. ultrasonic bursts separated by a 3 min. cooling period, using tap 6 of the Sonifier. During the sonication procedure, the sample temperature remained between 2 and 10°C. Examination of the sonicated sample on a Leitz Laborlux microscope with phase contrast optics at 400x demonstrated that no intact ghosts remained.

A 100 ml. portion of the above sonicated ghost sample was brought to $10^{12}$ M in $CaCl_2$ by the addition of a 1 M solution of $CaCl_2$ and then shaken vigorously in air for 15 min. at 25°C. The resulting reaggregated membrane suspension was then layered on an Eastman HT–00 cellulose acetate film by suction filtration of the suspension through the film while the latter was mounted in a Pyrex Millipore filter holder. The coated film was washed thoroughly with water and then mounted and tested in a reverse osmosis test cell. The membrane displayed a salt rejection of greater than 90 percent when 3,000 p.p.m. NaCl solution was passed through it at 1,000 p.s.i.g.

EXAMPLE 2

Another portion of freshly packed ghosts, prepared as in Example 1, was sonicated as in Example 1 except that greater membrane disruption was induced by treatment with 20 successive 30 sec. ultrasonic bursts, each separated by a 3 min. cooling period, using tap 8 of the Sonifier. Examination of the sonicated sample in the Leitz microscope under phase contrast at 2,000x and in an RCA 3F Electron Microscope at 20,000x demonstrated that no intact ghosts or vesicles were present in the sample. The sample was then centrifuged at 90,000 × g for 2 hours at 0°—5°C. in a Spinco Model L Ultracentrifuge. The yield of soluble membrane lipoprotein present in the clear supernatant solution was 80 percent.

A small aliquot of the above soluble lipoprotein solution was injected at the surface of a $10^{12}$M $MgCl_2$ solution contained in a Langmuir trough. The resulting reconstituted lipoprotein membrane formed at the air-water interface was compressed to 20 dynes/cm. and a series of ten layers of membrane were coated onto an Eastman RO–89 cellulose acetate film by the Langmuir-Blodgett dipping technique. The coated film was then tested for desalination of sea water at 1,500 p.s.i.g. in a reverse osmosis test unit and was found to produce potable water.

The membrane system of the subject invention also has utility in other processes than water desalination. For example, it is usable for the concentration of orange juice, grape juice, lemon juice, apple juice, milk, whey, beer and other beverages. It is also usable in the purification of waste and processing waters from a variety of industries, including pulp, paper making, mining, pharmaceuticals, food and municipal waste treatment. In addition other nonreverse osmosis applications of the permselective membrane plus porous support only (i.e. without the mechanical support) are found in the osmotic dehydration of perishable vertebrate fish, shell fish, fruits, and vegetables. In these applications the present membrane system may be substituted directly for prior art membranes already used in existing equipment known to those skilled in the art.

I claim:
1. A dialysis element for the separation of water from dissolved materials, including electrolytes, therein comprising:
   a mechanically strong reinforcing grid having adequate strength to stand superosmotic operating pressures in a dialysis chamber, and having a pore size of the order of one-fourth inch to about 1/1,000 inch,
   an intermediate support layer supported by said mechanically strong grid and which is permeable to both water and all ions in the system, and which furnishes a support for a
   permselective membrane of the order of 50 to 1,000 A. thickness, of a reconstituted, naturally occurring lipoprotein membrane derived from a living cell, which membrane itself is mechanically weak, and which membrane is highly permeable to water and comparatively impermeable to dissolved materials, including electrolytes.

2. The dialysis element of claim 1 in which the permselective membrane is derived from ghosts of mammalian red blood cells.

3. A dialysis element for the separation of water from dissolved materials, including electrolytes, comprising:
   a cellulose support layer which is permeable to both water and all ions in the system, and which furnishes a support for a
   permselective membrane of the order of 50 to 1,000 A. thickness, of a reconstituted, naturally occurring, lipoprotein membrane from a living cell wall, which membrane itself is mechanically weak, and which membrane is highly permeable to water and comparatively impermeable to dissolved materials, including electrolytes.

UNITED STATES PATENT OFFICE
CERTIFICATE OF CORRECTION

Patent No. 3,593,852      Dated July 20, 1971

Inventor(s) LEWIS SMITH MERIWETHER

It is certified that error appears in the above-identified patent and that said Letters Patent are hereby corrected as shown below:

Column 2, Table I, please delete "$Cl^1$" and insert --$Cl^-$--.

Column 2, Table I, please delete "$HCO_3^1$" and insert --$HCO_3^-$--.

Column 3, line 64, please delete "polystrene" and insert --polystyrene--.

Column 4, line 1, please delete "s" and insert --a--.

Column 5, line 4, please delete "$10^{15}$" and insert --$10^{-5}$--.

Column 5, line 72, after the word "Membranes" and before the word "Human," please insert a colon (:).

Column 6, line 27, please delete "$10^{12}$" and insert --$10^{-2}$--.

Column 6, line 54, please delete "$10^{12}$" and insert --$10^{-2}$--.

Signed and sealed this 16th day of May 1972.

(SEAL)
Attest:

EDWARD M. FLETCHER, JR.
Attesting Officer

ROBERT GOTTSCHALK
Commissioner of Patents